US011688012B2

United States Patent
Dani et al.

(10) Patent No.: US 11,688,012 B2
(45) Date of Patent: Jun. 27, 2023

(54) ASSET ASSESSMENT VIA GRAPHICAL ENCODING OF LIABILITY

(71) Applicant: International Business Machines Corporation, Armonk, NY (US)

(72) Inventors: Mohan Nagraj Dani, Bangalore (IN); Balaji Rishi Sundarajan, Hyderabad (IN); Sharath C Athrey, Bangalore (IN)

(73) Assignee: International Business Machines Corboration, Armonk, NY (US)

( * ) Notice: Subject to any disclaimer, the term of this patent is extended or adjusted under 35 U.S.C. 154(b) by 342 days.

(21) Appl. No.: 17/026,142

(22) Filed: Sep. 18, 2020

(65) Prior Publication Data

US 2022/0092696 A1    Mar. 24, 2022

(51) Int. Cl.
```
G06Q 40/08      (2012.01)
G06Q 40/06      (2012.01)
G06N 3/04       (2023.01)
G06T 7/00       (2017.01)
G06T 11/20      (2006.01)
G06Q 40/03      (2023.01)
```
(52) U.S. Cl.
CPC .............. *G06Q 40/06* (2013.01); *G06N 3/04* (2013.01); *G06Q 40/03* (2023.01); *G06Q 40/08* (2013.01); *G06T 7/0002* (2013.01); *G06T 7/97* (2017.01); *G06T 11/206* (2013.01); *G06T 2207/20072* (2013.01); *G06T 2207/20084* (2013.01)

(58) Field of Classification Search
None
See application file for complete search history.

(56) References Cited

U.S. PATENT DOCUMENTS

| 6,233,566 B1 | 5/2001 | Levine |
| 8,131,636 B1 * | 3/2012 | Viera ................ G06Q 40/025 |
| | | 705/38 |
| 8,462,162 B2 * | 6/2013 | Careri ................ G06T 11/206 |
| | | 345/473 |

(Continued)

FOREIGN PATENT DOCUMENTS

WO    2002023443 A1    3/2002

OTHER PUBLICATIONS

Billiot, M. J. (1997). Assessing environmental liability through risk premiums charged on loans to agribusiness borrowers (Order No. 9818672) . . . . Available from ProQuest Dissertations and Theses Professional. (304357088). Retrieved from https://dialog.proquest.com/professional/docview/304357088?accountid=131444 (Year: 1997).*

(Continued)

*Primary Examiner* — Kito R Robinson
(74) *Attorney, Agent, or Firm* — Scott S. Dobson

(57) ABSTRACT

A plurality of liability factors of an asset is identified. Each liability factor impacts a total liability of the asset. A magnitude of a predetermined magnitude scale is identified for each of the plurality of liability factors according to a predetermined magnitude scale. Each magnitude is graphically encoded into a liability image for the asset. A risk score of the asset is determined by analyzing historical correlations between respective magnitudes of the plurality of liability factors using image recognition techniques on the liability image.

20 Claims, 4 Drawing Sheets

(56) References Cited

U.S. PATENT DOCUMENTS

| | | | | |
|---|---|---|---|---|
| 2005/0228622 | A1* | 10/2005 | Jacobi | G06Q 40/08 703/2 |
| 2005/0262013 | A1* | 11/2005 | Guthner | G06Q 40/025 705/38 |
| 2011/0298805 | A1* | 12/2011 | Laurito | G06Q 40/06 705/36 R |
| 2012/0254066 | A1 | 10/2012 | Glomski | |
| 2014/0143134 | A1* | 5/2014 | Yan | G06Q 40/025 705/38 |

OTHER PUBLICATIONS

"Federal Home Loan Bank Stress Tests for Market and Credit Risk," Federal Housing Finance Agency, accessed Sep. 14, 2020, 2 pages. <https://www.fhfa.gov/DataTools/Downloads/Pages/Federal-Home-Loan-Bank-Stress-Tests-for-Market-and-Credit-Risk.aspx.

Anonymous, "Cognitive credit regulator for working capital for emerging economies," IP.com, Disclosure No. IPCOM000255679D, Oct. 9, 2018, 9 pages. <https://priorart.ip.com/IPCOM/000255679>.

Touchais et al. "An Approach to Securitisation in Europe NPLs—Machine Learning Model," Nova School of Business and Economics, Jan. 4, 2019, 124 pages, <https://run.unl.pt/handle/10362/73205 >.

Abdel-Jawad, "Applications of Optimization to Sovereign Debt Issuance," Department of Mathematical Sciences, Brunel University, Apr. 2013, 141 pages. <https://www.semanticscholar.org/paper/Applications-of-optimization-to-sovereign-debt-Abdeljawad/2ad053df109be7e7e23faed89039bdd8a8138ad1 >.

Cross, "Guidance on Value-at-Risk Modeling," Federal Housing Finance Agency, Oct. 6, 2003, 8 pages. <https://www.fhfa.gov/SupervisionRegulation/AdvisoryBulletins/Pages/Guidance-on-Value-at-Risk-Modeling.aspx>.

Woetzel et al., "Climate risk and response Physical hazards and socioeconomic impacts," McKinsey Global Institute, Jan. 2020, 164 pages. <https://www.mckinsey.com/~/media/mckinsey/business%20functions/sustainability/our%20insights/ climate%20risk%20and%20response%20physical%20hazards%20and%20socioeconomic%20impacts/ mgi-climate-risk-and-response-full-report-vf.ashx>.

* cited by examiner

ASSET ASSESSMENT VIA GRAPHICAL ENCODING OF LIABILITY

BACKGROUND

Many factors may be used to determine an overall value and/or liability of an asset. For example, an asset could be a thing that could be bought, invested in, insured, or the like. An organization may desire to acquire one of these assets (such as by purchasing the asset, investing in the asset, insuring the asset, etc.), and may therefore have a desire to evaluate this value and/or liability. However, it may be an extremely difficult and nuanced evaluation to weigh each of the factors to determine a true value and/or risk of an asset. For example, an asset may have dozens of factors of varying magnitudes that interrelate in different ways to have different impacts upon a value and/or risk of an asset.

SUMMARY

Aspects of the present disclosure relate to a method, system, and computer program product relating to risk analysis for an asset via generation of a graphical image that depicts liabilities for that asset. For example, the method includes identifying a plurality of liability factors of an asset, wherein each liability factor impacts a total liability of the asset. The method further includes identifying a magnitude of a predetermined magnitude scale of each of the plurality of liability factors. The method further includes graphically encoding each magnitude into a liability image for the asset. The method further includes determining a risk score of the asset by analyzing historical correlations between respective magnitudes of the plurality of liability factors using image recognition techniques on the liability image. A system and computer product configured to perform the above method are also disclosed.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
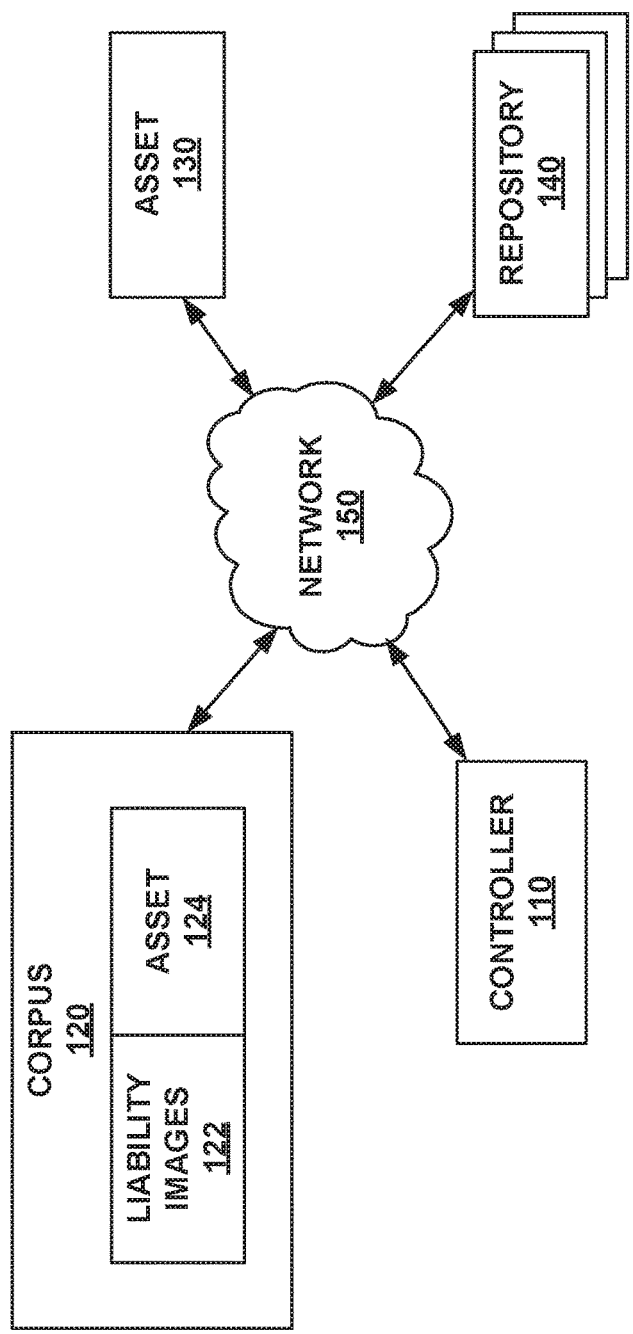
FIG. 1 depicts a conceptual diagram of one embodiment of a computing environment in which a controller generates liability images of assets to compare against liability images of a corpus in order to determine an amount of risk of these assets.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to evaluating assets, while more particular aspects of the present disclosure relate to generating an image that graphically encodes liability factors for an asset in order to determine a risk of the asset. While the present disclosure is not necessarily limited to such applications, various aspects of the disclosure may be appreciated through a discussion of various examples using this context.

A person or organizations may want to acquire an asset. For example, a person or organization may way to purchase an asset that can be owned, invest in an asset over a period of time, insure an asset, or the like. As used herein, "acquiring an asset" may relate to an action in which a person gains some economic stake in the asset. For example, an asset may include a collateralized debt obligation (CDO) of a plurality of loans that a person is considering investing in, such that a user must consider a risk of the CDO (and therein a risk of some or all of the loans, each of which have a plurality of factors that impact the risk of the loans) before deciding to acquiring a stake in the CDO. For another example, an asset may include a business loan (where the organization is the bank, and liability factors may include factors that make it less likely that the business loan will be repaid), or the asset may include a shipping voyage (where the organization is insuring or purchasing a take in the shipping voyage, and the liability factors include factors that make it less likely that the shipping voyage will arrive on time with all of the goods undamaged).

Before acquiring an asset, a first step would be finding out a risk and value of the asset. In some cases, it may be relatively easy to find out a value of the asset, but it may be relatively difficult to determine the risk. For example, there may be a great multitude of factors from the past, the present, and the future that impact a liability of an asset, and these factors may interrelate in unexpected and unpredictable ways.

As such, even with current conventional asset acquisition tools that aid in cataloguing various risk factors, it may be difficult for a person to identify which assets are worth acquiring in a quick timeframe. Rather, it may require the assistance of a highly trained and specialized analyst that is specifically trained to analyze each of the different asset categories, and this analyst may need to look at and consider each risk factor that is catalogued within the conventional asset acquisition tool. Further, in some examples an asset may be include a plurality of sub-assets that themselves all include liability factors, such as the aforementioned CDO of a plurality of loans. Each of these may have myriad factors that impact liabilities, such as historical factors (e.g., historical credit scores, interest rates), current factors (e.g., current geopolitical considerations, credit scores), future factors (e.g., a planned end date for a loan or shipping voyage) that may relate to the asset itself (e.g., terms or conditions of a loan), a borrower behind the asset (e.g., an income-to-debt ratio of a business asking for a loan), any natural hazards that may relate to the asset (e.g., wildfires/earthquakes/tornadoes that relate to a location associated with the asset, or pandemics that are in an area associated with the asset), or the like.

Aspects of this disclosure relate to systems and methods that generate images that graphically encode liability factors of an asset, so that a computer system may better analyze and isolate the liability factors to determine and provide a risk score of an asset. One or more computing controllers that include one or more processors executing instructions stored on one or more computing memories (these computing controllers discussed generically herein as a single computing controller) may generate such a liability image. A controller may generate such a liability image with little or no help from a trained user. For example, a controller may gather liability data related to an asset from one or more sources and graphically encode this liability data into an image according to predetermined techniques that uniquely identify and quantify these liability factors. The controller may then compare this generated liability image against a corpus of hundreds or thousands (or more) of images for other assets, where many of these stored images of the corpus have associated risk values and asset values. The controller may use a neural network or the like to evaluate comparisons between the images using unsupervised clustering techniques. The controller may be faster and more accurate at identifying correlations between the graphically isolated liability factors of the images and an amount of risk than either a trained analyst or a conventional systems that may do not more than return historical analyses that are within a bound of a query, such that aspects of the disclosure may improve an ability at accurately and reliably identifying a risk level of an asset.

For example, FIG. 1 depicts environment 100 that includes controller 110 that is configured to generate an image that graphically encodes liabilities for assets 130. Controller 110 may include a computing device, such as computing device 200 of FIG. 3 that includes a processor communicatively coupled to a memory that includes instructions that, when executed by the processor, cause controller 110 to execute the operations described below.

Controller 110 may generate a liability image for asset 130. In some examples, controller 110 may generate this liability image in response to receiving a request from a user device (not depicted) to generate a liability image for asset 130. As discussed herein, asset 130 may be a thing that an organization may acquire (e.g., monetize an involvement in).

Controller 110 may determine one or more liability factors of asset 130, where each of these liability factors impact a liability of assets 130. For example, liability factors may make it more or less likely that an organization may be able to successfully monetize asset 130, and/or liability factors may change a rate and/or manner of involvement at which an organization is able to successfully monetize asset 130. Liability factors may relate to asset 130 itself (e.g., business terms of asset 130), they may relate to an entity associated with asset 130 (e.g., a credit score of a business that is categorized as a borrower of asset 130, an industry of asset 130 borrower, etc.), and/or liability factors may relate to environmental factors that impact asset 130 (e.g., the economy, weather in a location in which assets 130 are stored/handled, etc.).

For example, asset 130 may include a loan of some variety that an organization may monetize by insuring (e.g., where the organization is an insurer) or investing in (e.g., where the organization is an investment agency). The loan may be on a commercial property, a business loan, or the like. In such an example, liability factors may impact a likelihood of the loan being paid off on time, being paid off ahead of schedule, or the like. For another example, asset 130 may include a shipping voyage that an organization is considering sponsoring/insuring/investing in, and liability factors may impact a likelihood of the shipment arriving at its destination according to a predicted schedule with all of the goods in a predetermined condition.

In some examples, controller 110 may receive all of this information of liabilities of asset 130 in a single message. For example, controller 110 may receive a single message that includes a form with asset 130 and liability data. In other examples, controller 110 may crawl across one or more repositories 140 to gather liability data. For example, controller 110 may receive a request relating to asset 130 that indicate a business, with which controller 110 utilizes a credit score repository 140 to determine a credit score that is associated with the business. Similarly, if controller 110 receives a request relating to asset 130 of shipping voyage across a particular shipping route, controller 110 may gather data relating to weather and incident reports from respective repositories 140 on these subjects. Controller 110 may use natural language processing (NLP) techniques as known in the art to ingest this data once discovered.

Once controller 110 gathers this data, controller 110 generates liability image as described herein and compares this generated liability image of asset 130 against liability images 122 of corpus 120. Controller 110 may use a neural network and/or unsupervised clustering techniques to compare and/or match a generated liability image to liability images 122 of corpus 120. Each liability image 122 of corpus 120 may be associated with a respective historical asset 124. In some examples, controller 110 may also compare factors of asset 130 to assets 124 of corpus. In other examples, controller 110 may identify a pool of assets 124 (and associated liability images 122) within corpus 120 that are relatively similar to asset 130, after which controller 110 may compare the associated liability images 122 within this pool to the generated liability image.

Controller 110 may access such repositories 140 and corpus 120 over network 150. Network 150 may include a computing network over which computing messages and/or computing data may be sent and/or received. For example, network 150 may include the Internet, a local area network (LAN), a wide area network (WAN), a wireless network such as a wireless LAN (WLAN), or the like. Network 150 may comprise copper transmission cables, optical transmission fibers, wireless transmission, routers, firewalls, switches, gateway computers and/or edge servers. A network adapter card or network interface in each computing/processing device (e.g., controller 110, corpus 120, and/or repositories 140) may receive messages and/or instructions from and/or through network 150 and forward the messages and/or instructions for storage or execution or the like to a respective memory or processor of the respective computing/processing device.

Though network 150 is depicted as a single entity in FIG. 1 for purposes of illustration, in other examples network 150 may include a plurality of private or public networks. For example, controller 110 and corpus 120 may communicate together over a private LAN of network 150 (e.g., as these two may be part of an organization that provides risk analysis capabilities for users). For another example, controller 110 may receive information from/regarding asset 130 through a coupling to a separate private WLAN that corresponds to respective assets 130 (e.g., where a business user sends a request regarding asset 130 to controller 110 from a private WLAN of the business over network 150).

Additionally, controller 110 may gather data related to users from repositories 140 over a public portion of network 150 using the Internet.

Once controller 110 gathers and/or receives sufficient liability data, controller 110 may generates a liability image for asset 130. In some examples, controller 110 may generate a single liability image that graphically encodes all identified liability data of asset 130 that controller 110 was able to identify. Controller 110 may generate these liability factors according to a predetermined technique to reflect a magnitude of each liability factor, where a larger magnitude indicates more risk. For example, if asset 130 is associated with an area with a high rate of earthquakes, controller 110 may generate a liability image that includes an "earthquake" liability factor that indicates a large magnitude to reflect this relatively high risk. Similarly, if asset 130 determines that asset 130 is a shipping voyage that is heading through what are typically calm waters, controller 110 may identify that this indicates a low liability and therein generate a liability image with a graphical element that indicates a low magnitude for, e.g., delays and/or damage.

Figure 2:
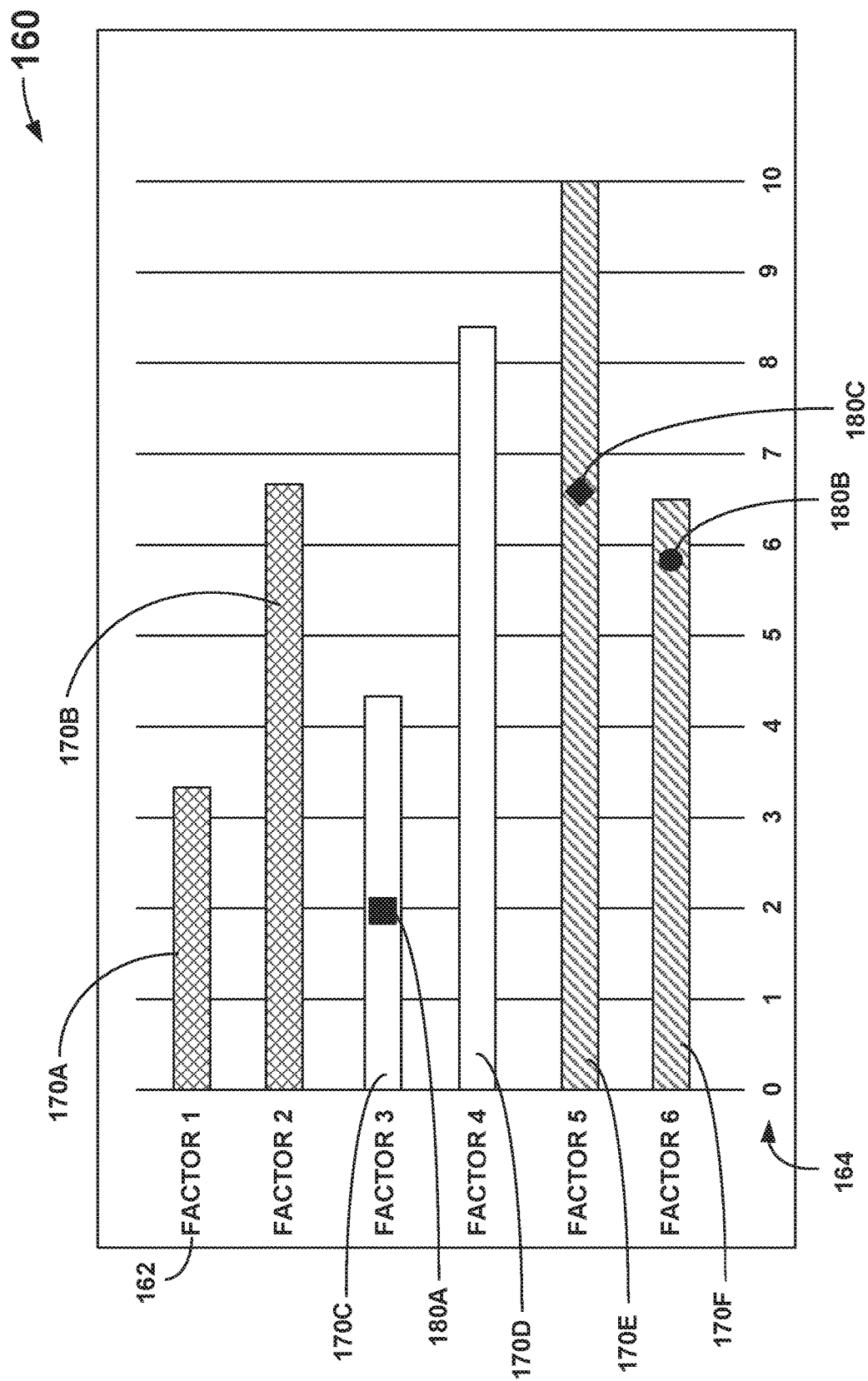
FIG. 2 depicts a conceptual depiction of an example liability image generated by the controller of FIG. 1 as relating to an asset of FIG. 1 in which liability factors of the asset are graphically encoded.

For example, FIG. 2 depicts a conceptualization of an example liability image 160 for asset 130. Controller 110 may generate liability image 160 such that every data point of liability data as gathered by controller is reflected as a separate and unique graphical element of liability image 160 in a predetermined manner. By generating liability image 160 such that respective graphical elements are stored uniquely in a predetermined manner, controller 110 may improve an ability to compare liability image 160 to other previously generated liability images 122 (that were generated in this predetermined manner) of corpus 120.

Controller 110 may generate liability image 160 to be a bar chart or the equivalent. For example, controller 110 may generate liability image 160 such that each distinct liability factor is represented by a different bar 170A-170F (collectively, "bars 170"). Though only 6 bars 170 are depicted within FIG. 2 for purposes of illustration, it is to be understood that controller 110 may generate liability image 160 to include any number of discrete graphical elements for any number of unique liability factors that is consistent with this disclosure.

Controller 110 may generate liability image 160 such that each of bars 170 has label 162 that identifies the respective liability factor. In some examples, labels 162 may be universal, such that controller 110 uses the same label for the same liability factor for all assets (e.g., such that each loan asset 130 includes a credit score liability factor and uses the exact same label 162 of "credit score" each time to label this credit score liability factor within liability image 160). By generating labels 162 according to a universal naming scheme, controller 110 may improve an ability to identify which liability factors drive an eventual total liability (and therein a total economic value) of asset 130. In other examples, controller 110 may use a different graphical element (e.g., a shading of bars 170) and/or a different type of metadata to provide a universally identifying tag to bars 170 rather than labels 162.

Each of bars 170 may have a different relative size. Different sizes of bars 170 may indicate a relative magnitude or severity of the respective liability factor. For example, a larger magnitude may indicate more liability, or a larger magnitude may indicate a larger number or value that is associated with the liability factor.

The size of bars 170 may relate to predetermined scale 164 of liability image 160. For example, as depicted, scale 164 may run between 0-10, though scale 164 may have any other number of divisions in other examples. In some examples, scale 164 may be logarithmic. Controller 110 may make bars 170 a size relative to scale 164 in a predetermined fashion, such that a given magnitude/value of a liability factor may always result in bars 170 of a same size. For example, one liability factor may be credit score, such that a respective bar 170 that ended at 0 on scale 164 would equate to a lowest possible credit score (e.g., a score of 350 for a standard FICO credit score) and a respective bar 170 that ended at 10 on scale 164 would equate to a highest possible credit score (e.g., a score of 850 for a standard FICO credit score), with respective values at proportional credit scores between 0 and 10.

As depicted, bars 170 may also be filled with different patterns. Additionally, or alternatively, bars 170 may include different colors, or different widths, or the like. These different graphical representations of bars 170 may indicate different characteristics of liability factors. For example, the hashing pattern of bars 170A, 170B may indicate that these bars 170A, 170B relate to a first class of liability factors, such as liability factors on a borrower of asset 130 (e.g., a credit score or an income of a business where asset 130 is a business loan, or the like). The blank pattern of bars 170C, 170D may indicate that these bars 170C, 170D relate to a second class of liability factors, such as liability factors related to occurrences at a geographical location related to asset 130 (e.g., such as a likelihood of inclement weather, a cost of insurance, or the like). Similarly, the diagonal pattern of bars 170E, 170F may indicate that these bars 170E, 170F relate to a third class of liability factors, such as liability factors related to asset 130 itself (e.g., a terms and conditions if asset 130 is a loan, materials or schedule if asset 130 is a shipping journey, industry if asset 130 is a business loan, or the like).

While liability image 160 depicts these different types of liability factors as on a single chart, in other examples controller 110 may generate liability images in which different types of liability factors are on separate charts. In some examples, each different chart may include a separate scale 164 with different values to reflect the different magnitudes/characteristics of the different types of the liability factors. Where controller 110 determines that some types of liability factors have more or less impact on an overall liability of asset 130 as a discrete class, controller 110 may improve an ability to accurately and reliably calculate this liability by dividing these different types of liability factors into separate graphical elements (e.g., separate charts with separate scales 164, separate graphical icons, separate predetermined keys for identifying graphical elements, or the like). For example, in some situations, controller 110 may generate a different version of liability image 160 with a first set of liability factors related to current "borrower" or originator of the asset 130, a second set of liability factors relating to terms of asset 130, a third set of liability factors relating to geographical factors relating to asset 130, or the like.

Controller 110 may generate liability image 160 to include graphical elements that depict events 180A, 180B, 180C (collectively, "events 180"). Events 180 may be things that occurred (or will occur) at discrete times. Events 180 may be planned, scheduled, and/or random/unpredictable. For example, event 180A may relate to a natural disaster that occurred that impacts asset 130 of liability image 160. A general graphical representation (e.g., a shape, size, color, or the like) of event 180A may indicate data regarding event 180A. For example, bar 170C may relate to flooding likelihood, and event 180A may relate to a specific flood that occurred for asset 130. The square shape of event 180A may indicate that it was a flood of a certain size. In some examples, the location of event 180A along the axis of bar 170C may indicate a relative recency of event 180A. For example, the size of bar 170C may indicate the full life of asset 130, such that event 180A being located at a middle of bar 170C indicates that event 180A happened at 50% of the full term of asset 130 (e.g., such that if asset 130 is a 4 year old loan that event 180A occurred 2 years ago). Other examples of how controller 110 generates graphical elements that depict events 180 to indicate a timing and/or characteristic of respective events 180 are also possible.

Similarly, controller 110 may store information on future events 180. For example, bar 170E may relate to a set of materials (where asset 130 is a shipping trip), and event 180B is a planned delivery of some of the materials (at a first stop along the shipping trip). Controller 110 may generate liability image 160 to indicate a predicted time and/or date of future event 180, such as by a general placement along a longitudinal axis of a respective bar 170. In some examples, scale 164 may include date information, and/or liability image 160 may include a second scale with different dates in the past and/or future (e.g., such that liability image 160 includes a first scale 164 for magnitude and a second scale for dates). Where controller 110 includes scale 164 that relates to dates and asset 130 relates to a loan, the dates of scale 164 may relate to the current life of the loan.

Once controller 110 generates liability image 160, controller 110 compares liability image 160 against other liability images of corpus 120. Controller 110 may compare liability image 160 against other liability images 122 of corpus 120 to determine a risk score of asset 130. For example, controller 110 may execute one or more graphical pattern-matching techniques known in the art to compare generated liability image 160 to liability images 122 of corpus 120. Each of liability images 160 may be associated with a historical risk score, such that if generated liability image 160 is determined to be a match with one of liability images 122, then controller 110 determines the risk score to be the historical risk score of the matched one of liability images 122. Similarly, if controller 110 determines that liability image 160 is between two liability images 122 of corpus 120, then controller 110 may determine a risk score of liability image 160 to be between the two risk scores of the two liability images 122.

Controller 110 may use machine learning techniques such as those described herein to match generated liability image 160 to one or more liability images 122 of corpus 120. For example, controller 110 may use a neural network to execute an unsupervised cluster technique determine which liability factors as indicated by which bars 170 have the most impact on an eventual risk score. For example, controller 110 may determine that even if 29 out of 30 liability factors as indicated by 29 out of 30 bars 170 of liability image 160 are exactly the same between generated liability image 160 and a single one of liability images 122 of corpus 120, that there may still be a poor match if a last liability factor is a poor match. Put differently, controller 110 may use a neural network or the like to determine which liability factors as depicted as discrete graphical features of generated liability image 160 have the most impact on a risk score of asset 130 as a result of controller 110 isolating and analyzing each of these features as an easily identifiable feature. Though different colors and shapes and sizes of different bar charts are discussed herein, it is to be understood that any mechanism of graphically uniquely quantifying and qualifying liability factors within a generated liability image 160 is consistent with this disclosure.

In some examples, controller 110 may identify that a generated liability image 160 may be a poor match to substantially all liability images 122 of corpus. For example, controller 110 may determine that liability image 160 may have a match that is below a threshold (e.g., 70%) as compared against liability images 122 of corpus 120, such that controller 110 is not able to determine a risk score with a threshold amount of confidence. In such examples, this liability image 160 may be flagged for further analysis by a trained operator, or put into a new "pool" of liability images 122 within corpus 120.

Controller 110 may compare a determined risk score of asset 130 against a predetermined or received risk appetite of a user as related to asset 130. For example, controller 110 may identify that a user that is looking to acquire a plurality of assets 130 (e.g., investing in asset 130, or purchasing asset 130, or insuring asset 130) of different types (e.g., a business loan, a CDO, and also some shipping events), where the user has different risk appetites for the different types, such that controller 110 may determine whether or not the calculated risk score passes the different risk appetites for the different assets 130. Where controller 110 determines that a risk score of asset 130 satisfies a threshold of a user, controller 110 may present this asset 130 to user as a recommended acquisition. For example, controller 110 may receive a request from a user that indicates a hundred assets 130 that the user is interested in acquiring, and controller 110 may identify each of these assets 130 that satisfy the thresholds set by the user. Controller 110 may provide this indication within a user interface of a user device of the user. For example, controller 110 may cause a user interface of a monitor of a computing device (e.g., a laptop or desktop computer) that is associated with the user to provide this recommendation. Controller 110 may interact with this user computing device over network 150.

Figure 3:
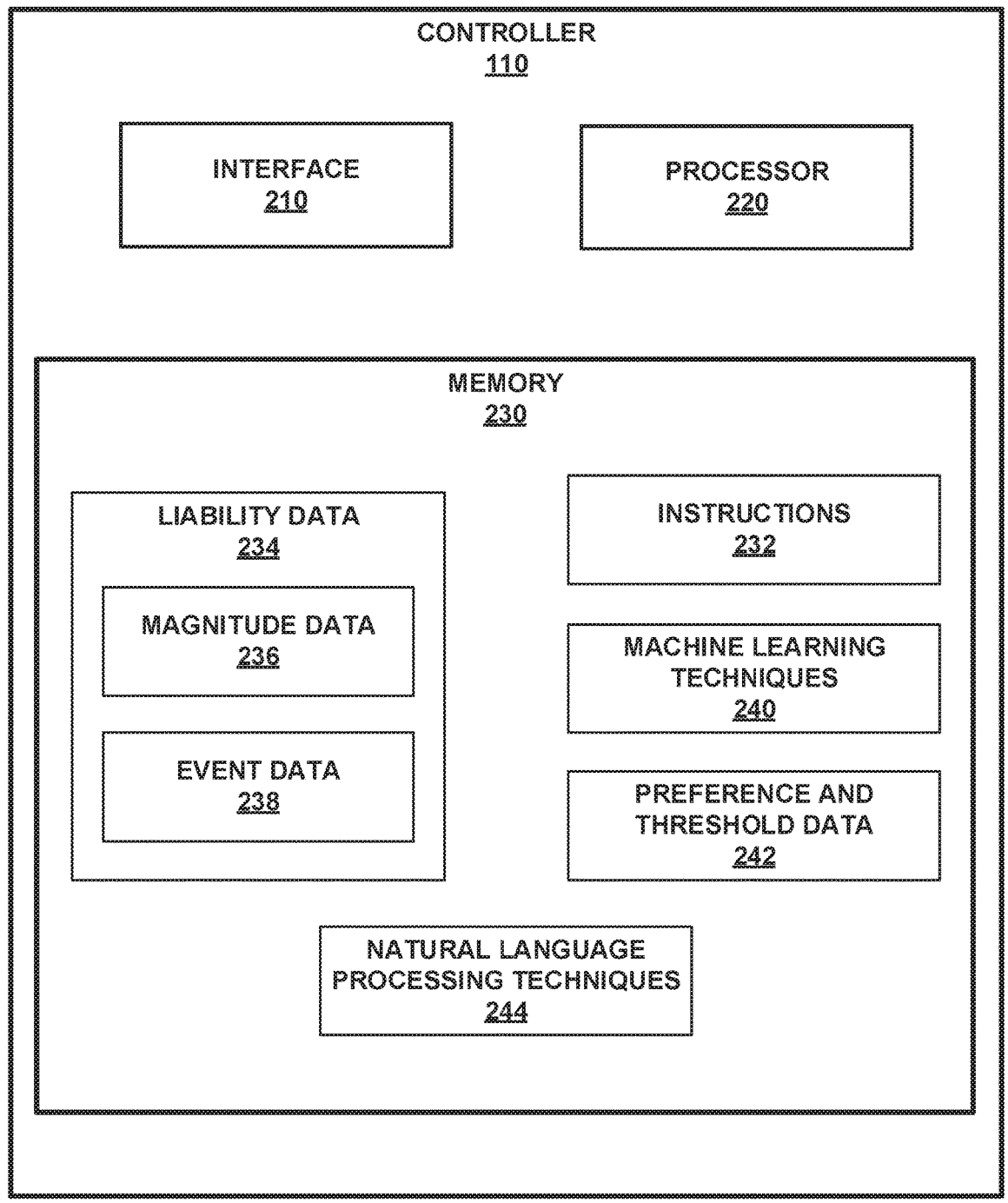
FIG. 3 depicts an example conceptual box diagram of the controller of FIG. 1.

As described above, controller 110 may include a computing device with a processor configured to execute instructions stored on a memory to execute the techniques described herein. For example, FIG. 3 is a conceptual box diagram of such computing device 200 of controller 110. While computing device 200 is depicted as a single entity (e.g., within a single housing) for the purposes of illustration, in other examples, controller 110 may be stored within computing device 200 that includes two or more discrete physical systems (e.g., within two or more discrete housings). Computing device 200 may include interfaces 210, processor 220, and memory 230. Computing device 200 may include any number or amount of interface(s) 210, processor(s) 220, and/or memory(s) 230.

Computing device 200 may include components that enable controller 110 to communicate with (e.g., send data to and receive and utilize data transmitted by) devices that are external to controller 110. For example, controller 110 may include interface 210 that is configured to enable controller 110 and components within controller 110 (e.g., such as processor 220) to communicate with entities external to controller 110. Specifically, interface 210 may be configured to enable components of controller 110 to communicate with corpus 120, a computing device sending information on asset 130, repositories 140, or the like. Interface 210 may include one or more network interface cards, such as Ethernet cards, and/or any other types of interface devices that can send and receive information. Any suitable number of interfaces may be used to perform the described functions according to particular needs.

As discussed herein, controller 110 may be configured to determine a risk score of asset 130 via a generated liability image 160. Controller 110 may utilize processor 220 to determine a risk score. Processor 220 may include, for example, microprocessors, digital signal processors (DSPs), application specific integrated circuits (ASICs), field-programmable gate arrays (FPGAs), and/or equivalent discrete or integrated logic circuits. Two or more of processor 220 may be configured to work together to determine a risk score via a generated liability image 160.

Processor 220 may generate liability image 160 of asset 130 in order to determine a risk score of asset 130 according to instructions 232 stored on memory 230 of controller 110. Memory 230 may include a computer-readable storage medium or computer-readable storage device. In some examples, memory 230 may include one or more of a short-term memory or a long-term memory. Memory 230 may include, for example, random access memories (RAM), dynamic random-access memories (DRAM), static random-access memories (SRAM), magnetic hard discs, optical discs, floppy discs, flash memories, forms of electrically programmable memories (EPROM), electrically erasable and programmable memories (EEPROM), or the like. In some examples, processor 220 may generate and analyze liability images according to instructions 232 of one or more applications (e.g., software applications) stored in memory 230 of controller 110.

In addition to instructions 232, in some examples gathered or predetermined data or techniques or the like as used by processor 220 to determine risk scores may be stored within memory 230. For example, memory 230 may include liability data on asset 130 as received and/or gathered by controller 110, and/or may include substantially all of historical liability images 122 and asset 124 data stored in corpus 120. For example, as depicted in FIG. 3, memory 230 may include liability data 234, which includes magnitude data 236 and event data 238. Liability data 234 may include all of the raw data on magnitude data 236 and event data 238 as well as the generated liability image 160 that captures magnitude data 236 and event data 238.

Memory 230 may include preference and threshold data 242. For example, preference and threshold data 242 may include data such as risk tolerances of a user, and a threshold that reflects this risk tolerances. Preference and threshold data 242 may also reflect a general value or type of asset 130 that a user is interested in.

Memory 230 may further include machine learning techniques 240 that controller 110 may use to improve a process of generating and analyzing liability images over iterations. Machine learning techniques 240 can comprise algorithms or models that are generated by performing supervised, unsupervised, or semi-supervised training on a dataset, and subsequently applying the generated algorithm or model to determine risk scores by comparing generated liability image 160 to historical liability images 122 according to preference and threshold data 242. Machine learning algorithms can include, but are not limited to, decision tree learning, association rule learning, artificial neural networks, deep learning, inductive logic programming, support vector machines, clustering, Bayesian networks, reinforcement learning, representation learning, similarity/metric training, sparse dictionary learning, genetic algorithms, rule-based learning, and/or other machine learning techniques.

For example, the machine learning algorithms can utilize one or more of the following example techniques: K-nearest neighbor (KNN), learning vector quantization (LVQ), self-organizing map (SOM), logistic regression, ordinary least squares regression (OLSR), linear regression, stepwise regression, multivariate adaptive regression spline (MARS), ridge regression, least absolute shrinkage and selection operator (LASSO), elastic net, least-angle regression (LARS), probabilistic classifier, naïve Bayes classifier, binary classifier, linear classifier, hierarchical classifier, canonical correlation analysis (CCA), factor analysis, independent component analysis (ICA), linear discriminant analysis (LDA), multidimensional scaling (MDS), non-negative metric factorization (NMF), partial least squares regression (PLSR), principal component analysis (PCA), principal component regression (PCR), Sammon mapping, t-distributed stochastic neighbor embedding (t-SNE), bootstrap aggregating, ensemble averaging, gradient boosted decision tree (GBRT), gradient boosting machine (GBM), inductive bias algorithms, Q-learning, state-action-reward-state-action (SARSA), temporal difference (TD) learning, apriori algorithms, equivalence class transformation (ECLAT) algorithms, Gaussian process regression, gene expression programming, group method of data handling (GMDH), inductive logic programming, instance-based learning, logistic model trees, information fuzzy networks (IFN), hidden Markov models, Gaussian naïve Bayes, multinomial naïve Bayes, averaged one-dependence estimators (AODE), Bayesian network (BN), classification and regression tree (CART), chi-squared automatic interaction detection (CHAID), expectation-maximization algorithm, feedforward neural networks, logic learning machine, self-organizing map, single-linkage clustering, fuzzy clustering, hierarchical clustering, Boltzmann machines, convolutional neural networks, recurrent neural networks, hierarchical temporal memory (HTM), and/or other machine learning techniques.

Memory 230 may include NLP techniques 244 that controller 110 may use to identify whether data stored in repositories 140 impact a liability and/or value of asset 130. NLP techniques 244 can include, but are not limited to, semantic similarity, syntactic analysis, and ontological matching. For example, in some embodiments, processor 220 may be configured to parse comments from a news source or the like in repositories 140 to determine semantic features (e.g., word meanings, repeated words, keywords, etc.) and/or syntactic features (e.g., word structure, location of semantic features in headings, title, etc.) of weather data or other types of natural event in an environment of asset 130. Ontological matching could be used to map semantic and/or syntactic features to a particular liability. The concept can then be used to determine the subject matter. In this way, using NLP techniques 244, controller 110 may, e.g., identify publicly available data that impacts a liability of asset 130.

Figure 4:
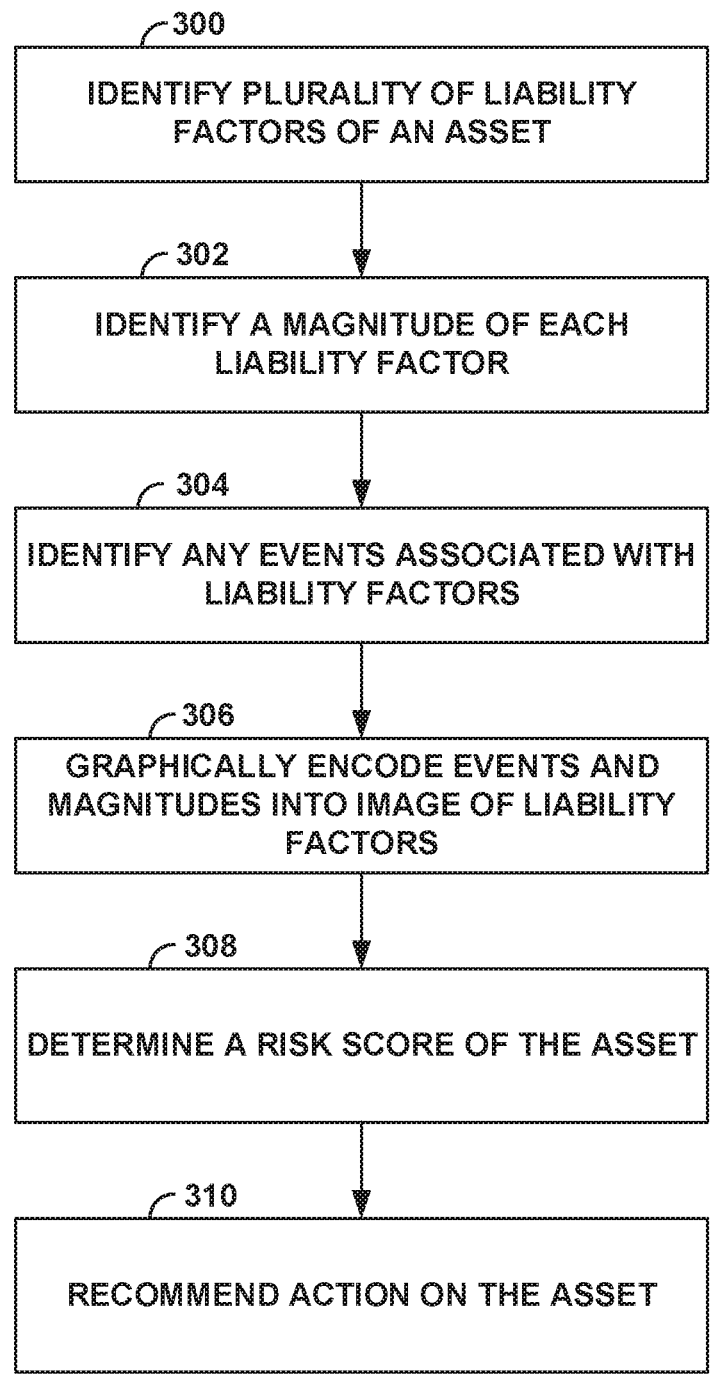
FIG. 4 depicts a flowchart of an example method of generating a liability image that graphically encodes liability factors of an asset in order to determine a risk score of the asset.

Using these components, controller 110 may determine a risk score of asset 130 via generated liability image 160 as discussed herein. For example, controller 110 may generate liability image 160 according to the flowchart depicted in FIG. 4. The flowchart of FIG. 4 is discussed with relation to FIG. 1 for purposes of illustration, though it is to be understood that other systems may be used to execute the flowchart of FIG. 4 in other examples. Further, in some examples controller 110 may determine risk scores differently than the flowchart of FIG. 4, or controller 110 may determine risk scores via a similar method with more or less steps in a different order, or the like.

Controller 110 identifies a plurality of liability factors of asset 130 (300). Controller 110 may receive these liability factors from a request from a user (e.g., a request to determine a risk score of asset 130). Alternatively, or additionally, controller 110 may gather these liability factors itself by crawling through one or more repositories 140. Controller 110 may identify a magnitude of each liability factor (302). Controller 110 may identify a magnitude according to a predetermined scale (e.g., a scale between 1 and 10), such that controller 110 always will determine a liability factor of a given type with a given value for a given asset 130 to have the same magnitude.

Controller 110 may identify events associated with liability factors (304). Liability factors may be datapoints that impact a liability of asset 130. For example, a liability event may include a natural disaster, a loan termination date, a forgiveness date, or the like. Liability factors may be regarding things from the past, things regarding a current situation, things regarding a future situation, or a combination of these.

Controller 110 graphically encodes liability data into liability image 160 (306). Controller 110 may graphically encode liability image 160 into a bar chart, where a relative size of bars 170 indicates a magnitude of the respective liability factor. Further, controller 110 may include graphical symbols that indicate events 180 that indicate liability. In some examples, controller 110 place these symbols at locations that reflect a timing or category of events 180. In some examples, a size or shape of these symbols may also reflect data of events 180.

Controller 110 may determine a risk score for asset 130 (308). For example, controller 110 may calculate a number that corresponds to a historical amount of risk of asset 130. Controller 110 may determine this risk score by visually comparing the generated liability image 160 against historical liability images 122 of corpus 120. Controller 110 may use a version of pattern matching that accounts for the possibility that some factors may be more important than others. Alternatively, in some examples controller 110 may provide graphical indications within liability image 160 that indicate whether or not a liability factor is relatively more important or not, such that pattern matching that stresses these graphical elements returns an equivalent risk score. Controller 110 may determine what risk score best fits with how generated liability image 160 fits within liability images 122 of corpus. Controller 110 may determine this risk score to correspond to a general value of asset 130, such that, e.g., more or less liability is acceptable (e.g., results in a higher or lower risk score) if asset 130 is worth more.

Controller 110 may recommend an action on asset 130 (310). For example, controller 110 may determine whether or not risk score is above or below a threshold of a user that relates to acquiring asset 130. Controller 110 may have received a request to generate the liability image from a user, and controller 110 may recommend this action to the user. For example, controller 110 may provide this recommendation on a user interface used by user. This recommendation may include an affirmative or negative, and/or a metric. In some examples, this recommendation may indicate what liability factors were most impactful in generating the risk score. By providing a recommendation and also providing the most indicative liability factors, controller 110 may enable a user to quickly decide whether or not to take an action for asset 130.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method comprising:
   identifying a plurality of liability factors of an asset, wherein each liability factor impacts a total liability of the asset;
   identifying a magnitude of a predetermined magnitude scale of each of the plurality of liability factors;
   graphically encoding each magnitude into a liability image for the asset; and
   determining a risk score of the asset by analyzing historical correlations between respective magnitudes of the plurality of liability factors using image recognition techniques on the liability image.

2. The computer-implemented method of claim 1, wherein analyzing historical correlations includes comparing the liability image against a plurality of liability images of a plurality of assets that all satisfy a threshold similarity to the asset, wherein each of the plurality of liability images includes graphically encoded respective magnitudes of respective liability factors.

3. The computer-implemented method of claim 2, wherein a neural network executes the comparing the liability image against the plurality of liability images.

4. The computer-implemented method of claim 1, wherein the liability image includes a bar chart with a bar for each of the plurality of liability factors, and a size of the bar is relative to the respective magnitude of the respective liability factor.

5. The computer-implemented method of claim 1, further comprising graphically encoding events relating to liability factors into the liability image, wherein the determining the risk score of the asset includes analyzing how the events correspond to respective magnitudes of the plurality of liability factors using image recognition techniques.

6. The computer-implemented method of claim 5, wherein the liability image includes a bar chart with a bar for each of the plurality of liability factors, and a size of the bar is relative to the respective magnitude of the respective liability factor, and a location of respective events of respective liability factors relative to respective bars of these respective liability factors indicate a timing of the respective events.

7. The computer-implemented method of claim 1, further comprising determining whether the risk score satisfies a pre-determined risk threshold that corresponds to a value of acquiring the asset.

8. The computer-implemented method of claim 1, further comprising providing a recommended action regarding the asset to a user via a user interface based on the determined risk score.

9. The computer-implemented method of claim 1, wherein the liability image includes a plurality of charts that each include magnitudes of one of a plurality of discrete classes of the plurality of liability factors, where the plurality of discrete classes includes:
   a class related to one or more geographical locations of the asset:
   a class related to terms of the asset; and
   a class related to a current borrower of the asset.

10. The computer-implemented method of claim 1, wherein the liability image is graphically encoded such that graphically analyzing the liability image enables the determination of the risk score.

11. The computer-implemented method of claim 10, wherein all identified liability factors are encoded into the liability image which is a single liability image for the asset, such that graphically analyzing the single liability image enables the determination of the risk score.

12. A system comprising:
a processor; and
a memory in communication with the processor, the memory containing instructions that, when executed by the processor, cause the processor to:
identify a plurality of liability factors of an asset, wherein each liability factor impacts a total liability of the asset;
identify a magnitude of a predetermined magnitude scale of each of the plurality of liability factors;
graphically encode each magnitude into a liability image for the asset; and
determine a risk score of the asset by analyzing historical correlations between respective magnitudes of the plurality of liability factors using image recognition techniques on the liability image.

13. The system of claim 12, wherein analyzing historical correlations includes comparing the liability image against a plurality of liability images of a plurality of assets that all satisfy a threshold similarity to the asset, wherein each of the plurality of liability images includes graphically encoded respective magnitudes of respective liability factors.

14. The system of claim 13, wherein the processor utilizes a neural network to execute the comparing the liability image against the plurality of liability images.

15. The system of claim 12, wherein the liability image includes a bar chart with a bar for each of the plurality of liability factors, and a size of the bar is relative to the respective magnitude of the respective liability factor.

16. The system of claim 12, the memory containing additional instructions that, when executed by the processor, cause the processor to graphically encode events relating to liability factors into the liability image, wherein the determining the risk score of the asset includes analyzing how the events correspond to respective magnitudes of the plurality of liability factors using image recognition techniques.

17. The system of claim 16, wherein the liability image includes a bar chart with a bar for each of the plurality of liability factors, and a size of the bar is relative to the respective magnitude of the respective liability factor, and a location of respective events of respective liability factors relative to respective bars of these respective liability factors indicate a timing of the respective events.

18. A computer program product, the computer program product comprising a computer readable storage medium having program instructions embodied therewith, the program instructions executable by a computer to cause the computer to:
identify a plurality of liability factors of an asset, wherein each liability factor impacts a total liability of the asset;
identify a magnitude of a predetermined magnitude scale of each of the plurality of liability factors;
graphically encode each magnitude into a liability image for the asset; and
determine a risk score of the asset by analyzing historical correlations between respective magnitudes of the plurality of liability factors using image recognition techniques on the liability image.

19. The computer program product of claim 18, wherein analyzing historical correlations includes comparing the liability image against a plurality of liability images of a plurality of assets that all satisfy a threshold similarity to the asset, wherein each of the plurality of liability images includes graphically encoded respective magnitudes of respective liability factors.

20. The computer program product of claim 19, wherein a neural network executes the comparing the liability image against the plurality of liability images.

\* \* \* \* \*